J. Hatch.
Button.
No. 1563. Reissued. Nov. 3. 1863.
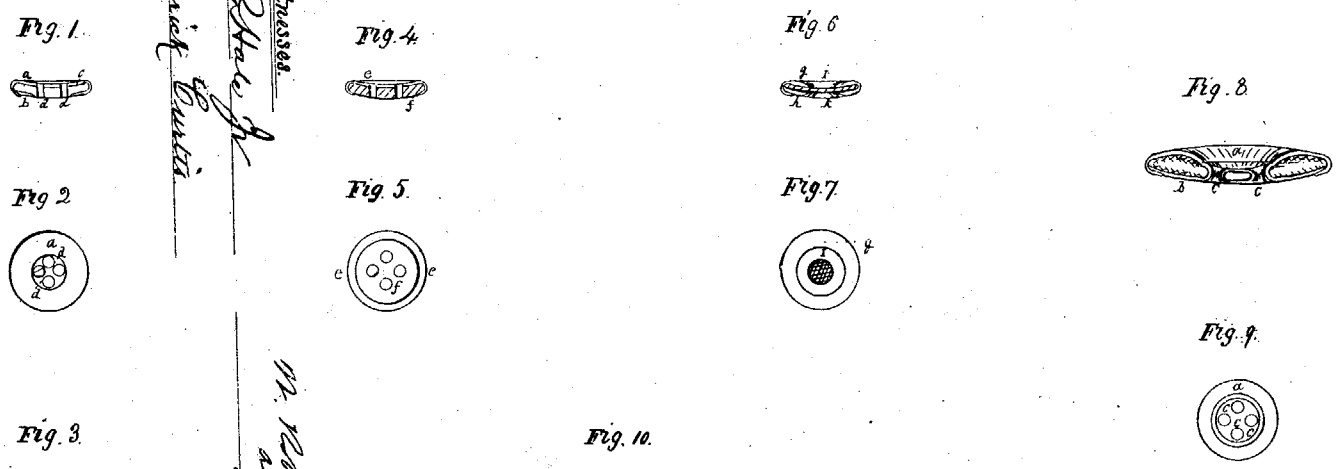
Witnesses.
H. P. Hale Jr
Frederick Curtis
W. Robson
assignor
by his attorney
R. M. Lady

UNITED STATES PATENT OFFICE.

WILLARD ROBINSON, OF ATTLEBOROUGH, MASSACHUSETTS, ASSIGNEE OF JOHN HATCH, OF SAME PLACE.

IMPROVEMENT IN BUTTONS.

Specification forming part of Letters Patent No. 3,915, dated February 20, 1845; extended seven years February 20, 1859; Reissue No. 1,563, dated November 3, 1863.

*To all whom it may concern:*

Whereas JOHN HATCH, late of Attleborough, in the county of Bristol and State of Massachusetts, did, during his life-time, invent a new and useful Improvement in the Manufacture of Pantaloon-Buttons, and did apply for and procure Letters Patent thereon, the said Letters Patent bearing date the 20th day of February, A. D. 1845; and whereas, upon petition and due proceedings had, the said Letters Patent have been extended for the term of seven years from and after the expiration of the first term—viz., from the 20th day of February, A. D. 1859; and whereas, by an assignment duly recorded in the United States Patent Office, the undersigned, WILLARD ROBINSON, of said Attleborough, has become the sole owner or assignee of the said Letters Patent and the exclusive property covered thereby. Now, therefore, I, the said WILLARD ROBINSON, do hereby declare the said invention to be described, as follows:

For the sake of better illustrating the construction of the said improved button or manufacture as well as that of others hereinafter referred to, they are represented in the said drawings on a samewhat larger scale than that on which they are generally manufactured. Besides this, views of buttons as otherwise constructed and in common use are given.

Figure 1 denotes a transverse and central section of a button composed of two plates, *a b*, of metal, having a circular plate or piece, *c*, of wood between them, the eyelet or thread-holes *d*, *d*, and *e* being bored or otherwise made through the wood and plates of metal. Fig. 2 is a top view of such a button, and Fig. 3 a bottom view of it. Fig. 4 is a cross-section of another button, which is composed simply of a plate, *e*, of metal, and a circular piece of wood, *f*, the eyelet or thread-holes being made as in the button exhibited in Figs. 1, 2, and 3. Fig. 5 is a bottom view of the same. Fig. 6 is a cross-section of a third kind of button, composed of two plates, *g h*, and a piece, *i*, of cloth placed between them, there being a circular aperture, *k*, cut through each piece of metal at the center of it, by which the cloth is exposed, as seen in Figs. 6 and 7, the latter being a top view of the button.

The button is secured to an article of clothing by sewing through it and the cloth *i*. My improved button is represented in Figs. 8, 9, and 10, the former being a cross-section, the next a top view, and the latter a bottom view, of it.

The cost and modes of construction of the various kinds of buttons adopted before the date of the invention of the said HATCH, and of which drawings are herewith given, have rendered them very objectionable in certain respects, the principal against those exhibited in Figs. 1 to 5, inclusive, being that the eyelets or thread passages of such buttons, by their peculiar construction, soon wear or cut out the thread by which the buttons, when on a garment may be confined thereto.

The button represented in Figs 6 and 7 has proved a very good one; but owing to the nicety required in its manufacture it is a very expensive one, and liable to serious objection on this latter account.

The improved button of the said HATCH is composed simply of two pieces or stamped circular plates of metal, *a* and *b*, Figs. 8, 9, and 10. Previous to their being applied and secured to each other two or any other suitable greater number of holes *c c*, &c., are punched through each plate *a b* in such manner as to leave a regular conical or tapering bur projecting from each orifice and from the plate, as seen in section in Fig. 8. The burs of one plate are placed in or nearly in contact respectively with those of the other, and so that the opening at the extremity of each bur shall be placed in direct opposition, and coincide with that of the bur of the other plate. Each thread passage or hole through the button will thus be composed of two of the burs, and will be countersunk on each side of the button, as seen in the drawings. The two circular plates are confined in contact with each other by the edge of the upper being turned over that of the lower of the said plates, as will be understood by button-makers, and when the two plates are pressed together in order to be confined to each other the extremities of the two burs of each of the thread-passages are united or pressed together sufficiently or are in positions to make a smooth passage for the thread through the button. A button thus made will wear a much longer time upon clothing than one as generally made of metal and wood as sold in the market.

I do not claim as the invention of the said HATCH the making of what is termed a "pantaloon-button" in two pieces of metallic plate held together by the edge of one being turned over upon the edge of the other; nor do I claim as the invention of the said HATCH the combination of two plates (so applied to each other) with a circular or other proper shaped piece of wood or cloth or woven material placed between them. Neither do I claim as the invention of said HATCH the combination of a plate of metal and a circular disk of wood, the former being confined to the latter by having its edges lapped over and pressed down upon those of the latter.

What is claimed by me as the invention of the said HATCH is—

The improved manufacture or pantaloon-button as made of two metallic plates, and having two or more eyelets, each of which is formed with a countersink in each of the plates, and with the countersink of one plate arranged in reverse of that of the other, substantially as described.

WILLARD ROBINSON.

Witnesses:
R. H. EDDY,
F. P. HALE, Jr.